Jan. 12, 1937.                T. W. ROLPH                2,067,416
                               LUMINAIR
                          Filed May 27, 1931
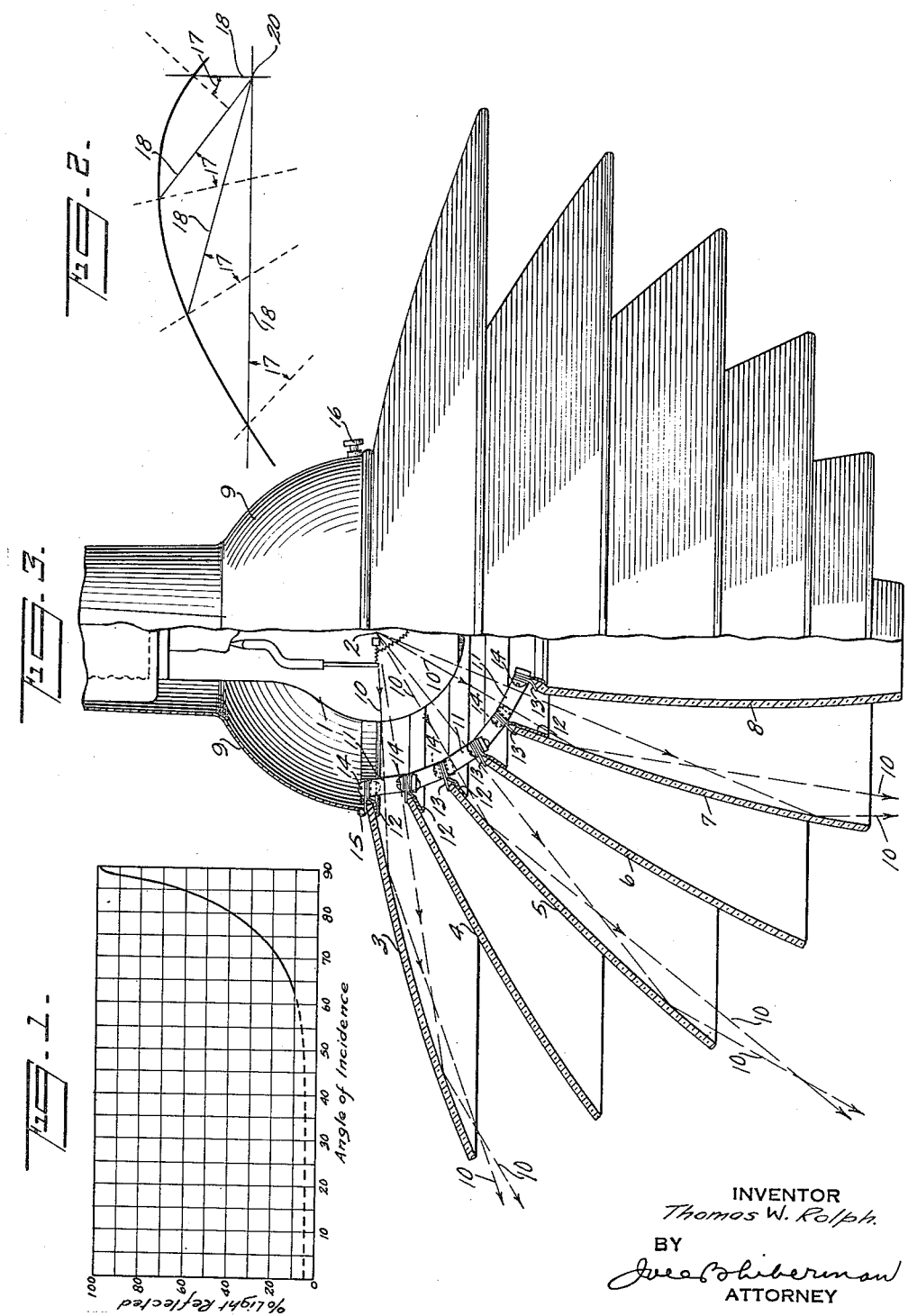
INVENTOR
Thomas W. Rolph.
BY
Jacob Biberman
ATTORNEY Patented Jan. 12, 1937

2,067,416

UNITED STATES PATENT OFFICE 2,067,416

LUMINAIR

Thomas W. Rolph, Newark, Ohio, assignor to Holophane Company, Inc., New York, N. Y., a corporation of Delaware Application May 27, 1931, Serial No. 540,226

8 Claims. (Cl. 240—1)

The present invention relates to luminairs and is more particularly directed toward such luminairs wherein substantially all the visible and ultra-violet flux from a mercury glow lamp is distributed in useful directions and the source effectively shielded against direct vision.

An object of this invention is to provide a luminair in which the redirection of light is obtained largely by surface reflection from the surfaces used in the luminair. While such a luminair is suitable for a great variety of light sources, it is of especial value for light sources which are rich in ultra-violet radiation. The reason for this is that most materials used for transmitting, diffusing or reflecting visible light tend to absorb a high percentage of ultra-violet radiation. If reflection can be obtained at the surface of such materials, the light so reflected does not enter the material and, hence, is not subject to absorption.

When a surface of glass or similar material is so placed with relation to the light source that the angle of incidence at the surface is high, a considerable proportion of the light does not enter the medium, but is reflected by what is known as a surface reflection. This principle is utilized, and, by disposing the glass surfaces about the light source in such a way as to attain high angles of incidence, a high percentage of reflected light is obtained.

A consideration of the characteristics of materials usually used for luminairs will show the great advantage to be obtained by utilizing surface reflection in luminairs which are designed for sources of ultra-violet radiation. Clear crystal glass now available will not reflect enough light, incident at ordinary angles, to be of service. If prisms are used on this glass to reflect the light or to refract it into useful directions, the light must pass into the glass and out again. The usual forms of glass are heavy absorbers of ultra-violet radiation, and there is accordingly much loss of such radiation in the course of its path through the glass. If a special composition of glass is used, which will transmit ultra-violet radiation efficiently, the cost of the material is greatly increased and manufacturing difficulties are encountered.

Between the light source and the eye it is desirable to use materials which will diffuse light and shield the eye from the brilliancy of the source. Thin sheets of clear ultra-violet transmitting glass will not provide any diffusion for the visible light passing through. If such glass is etched to provide diffusion, the amount of light scattered through the glass is increased and, hence, the length of the average path of light through the glass is increased. This increases absorption and particularly the absorption of ultra-violet radiation. Experiments have indicated that it is not practical to obtain a large degree of diffusion of the transmitted light without serious increase in absorption of the ultra-violet radiation. The same situation obtains with opal glasses. With such glasses diffusion is obtained by means of many reflections of light back and forth within the glass. Even with the best forms of ultra-violet transmitting glass, the addition of opal for obtaining diffusion will increase the absorption of ultra-violet radiation very greatly. It follows that the diffusion or redirection of ultra-violet light by any means which permits radiation to enter into glass and leave it again tends to be an inefficient process.

Metal reflectors of certain types may be used for ultra-violet radiation and some materials are quite efficient in their reflecting properties. For lighting the usual interior, however, metal reflectors are not generally suitable because they do not permit any light to pass upward and thus tend to give a gloomy effect to the room. Metal reflectors, as customarily used in luminairs, do not intercept all of the downward light, and this leaves the brilliant light source exposed to view, which is undesirable.

It will be clear, therefore, that, if a luminair can be constructed using a light transmitting medium which will shield the light source from view and in which a large amount of redirection of light is obtained by surface reflection, the luminair will reflect ultra-violet radiation with a considerable degree of efficiency and at the same time permit some transmission and diffusion, as well as redirection of the visible light.

The amount of reflection obtained at any glass surface is a function of the angle of incidence and the index of refraction of the material. The index of refraction of any material varies with the wave length of the light striking it, but within the range of visible radiation and healthful ultra-violet light, the variation is small. Nevertheless, the tendency of this variation will be in the direction of producing more surface reflection of ultra-violet radiation than of visible radiation, and this is a desirable tendency with luminairs constructed for sources of ultra-violet radiation in accordance with this invention.

The accompanying drawing shows, for purposes of illustrating the present invention, one form in which it may be embodied, it being understood that the drawing is illustrative of the invention rather than limiting the same.

In this drawing:

Figure 1 is a curve showing the percentage of light reflected at various angles of incidence by glass;

Figure 2 is a curve illustrating a logarithmic spiral; and

Figure 3 is a sectional view of a luminair with part in elevation.

Figure 1 shows the percentage of light reflected for various angles of incidence with glass having an index of refraction of 1.50. This index of refraction is representative of glass generally available for use in luminairs. It will be seen that at angles of incidence from 0° to about 60°, as customarily obtained in luminairs, the amount of surface reflection is small, ranging from 4% to 9%. However, when the angle of incidence is increased to 75°, the amount of light reflected by surface reflection is 25%; at 80° it is nearly 40%, at 85° over 60%, and at 87½° about 80%. In order to utilize the high percentages of surface reflection which may thus be obtained at high angles of incidence, it is necessary to design luminairs with reflecting surfaces so shaped and so placed with reference to the light source that a large proportion of the light will strike these surfaces at high angles of incidence. It is also desirable to place these surfaces with reference to the light source so that no light escapes toward the eye between the surfaces, thereby shielding the light source from view.

It will usually be desirable to design the reflecting surfaces of such a shape that the angle of incidence will not only be high but will also be uniform throughout the length of the surface. The efficiency of the reflector will then be the same for all points on its surface. The form of curve for which the angle of incidence from a point source is the same at all points on the curve is a logarithmic spiral. Fig. 2 shows such a curve. The angles of incidence 17 for light rays 18, from a source at the pole 20, are all of equal value. Sections of this spiral form, of the desired angle of incidence, will usually be the preferred form of curvature for the reflectors. This form of curvature is shown in the reflectors in the luminair illustrated in Figure 3. These reflectors are surfaces of revolution formed by rotating sections of logarithmic spirals about the common vertical axis of the lamp and luminair.

Figure 3 shows a vertical cross section and side view of a luminair designed on this principle and coming within the scope of this invention. In this figure, 1 is a lamp bulb containing a source of light 2, which produces both visible and ultraviolet radiation. Light passes out from the radiation source and strikes the reflectors 3, 4, 5, 6, 7, and 8. These are disposed about the light source in such a way that no light from the source will pass between them. Therefore, within the angles included by these reflectors, all light is intercepted by them and the light source is completely shielded. The reflectors are so shaped and so placed with respect to the light source that the angles of incidence of the flux striking the surface is high. This insures a high degree of surface reflection. Typical reflected light rays 10—10 are shown.

In this particular luminair, the angle of incidence at all points on the reflectors is 80° and the surface reflection, with glass of an index of refraction of 1.5, is, therefore, approximately 40%. This means that approximately 40% of the incident light is reflected from the surface and directed downward into useful directions. The balance of the light passes into the glass. Within the glass the light is partly absorbed and partly diffused and reflected again or transmitted at the outer surface. If the glass is not a good transmitter of ultra-violet radiation, the ultra-violet radiation passing into the glass will tend to be largely absorbed. The visible light will not be so readily absorbed, and a proportion of this will be reflected outwardly and downwardly, while another portion will be transmitted upwardly and diffused generally about the room to give the desirable effect obtained by such diffusion.

As stated above, the amount of radiation reflected by surface reflection will depend upon the angle of incidence. The greater the angle of incidence, the greater the amount of surface reflection. The angle of incidence shown in Figure 3 might be increased with an increase in the efficiency of reflection. This would require reflectors of greater diameter or a greater number of reflectors of the same diameter to intercept light throughout the same spherical angle. The angle of incidence might be decreased with a decrease in the efficiency of reflection and a lesser number of reflectors used. The selection of the best angle in any particular case will depend upon the degree to which efficiency of reflection can be sacrificed for simplicity of construction.

The percentage of useful light can be increased by using a reflector above the light source. The reflector may be spherical in form to return light rays back through the light source toward the lower reflectors, or it may be of some other form to reflect light between the lower reflectors or in other directions. A spherical reflector is indicated at 9 in Figure 3. Instead of a spherical reflector, one may employ a reflector which returns the light without passing it through the bulb, thereby avoiding bulb absorption of the ultraviolet radiation. The reflector should have a surface of oxidized aluminum or some similar efficient reflector of both visible and ultra-violet radiation.

A suitable method of assembling and supporting the various parts of the luminair is shown in Figure 3. 11 is a strap of which approximately four will be required to support the reflectors. Each reflector is supported by a circular collar 12 and this in turn is fastened to the straps 11 by means of clips 13 and screws 14. A hinge 15 is shown, and on the opposite side of the spherical reflector a latch 16. Thus the lower part of the luminair can be unlatched and swung down for relamping. It will be understood that the invention is not limited to this form of mechanical construction.

In Figure 3 glass reflectors are shown. However, the reflectors could be made of metal, porcelain enamel, or any other suitable material. Glass is preferred in order to obtain some diffusion of visible light upwardly. Prismatic glass could be used so that the visible light not reflected from the surface will enter the material and be reflected or refracted, as desired and in accordance with the form of prisms used. Opal glass could be used, and with opal glass a portion of the light which enters the glass would be reflected back downwardly and another portion diffused upwardly. Clear crystal glass or etched crystal glass may be used, but prismatic or opal glass reflectors are generally preferable because they provide greater shielding for the light source and so protect the eyes from the brightness obtained by the direct transmission of visible light toward the eye.

The luminair shown in Figure 3 is constructed to deliver a high percentage of light downwardly in a distribution of light symmetrical with respect to the nadir. It will be clear, however, that, by proper arrangement and shape of the reflecting surfaces, other forms of distribution can be obtained and the invention is not confined to luminairs giving downward light redirection or to luminairs giving symmetrical light distribution. The reflector shown is smooth, but, if one wishes to obtain further surface reflection, radial flutes may be superimposed on the same.

It is obvious that the invention may be embodied in many forms and constructions within the scope of the claims, and I wish it to be understood that the particular form shown is but one of the many forms. Various modifications and changes being possible, I do not otherwise limit myself in any way with respect thereto.

I claim:

1. A luminair comprising a light source and a plurality of curved, annular reflecting surfaces adapted to receive light from the light source at the same high angle of incidence for all points on each reflecting surface, whereby the angle of reflection is high and the reflected light is projected away from the light source with small change in direction.

2. A luminair comprising a light source and a plurality of reflecting surfaces each formed of a surface of revolution about the light source, each surface having a curvature such that a plane through the axis intercepts the surface in a logarithmic spiral whose pole is the light center.

3. A luminair comprising a light source and a plurality of reflectors, which are surfaces of revolution formed by the rotation about a common axis of a series of logarithmic spirals having a common pole at the light center.

4. A luminair comprising a substantially point light source and a plurality of diverging reflectors disposed about the light source, each presenting a concave surface of identical curvature to the incident light, the curvature of all the reflectors being such that the angle of incidence is uniform for the entire surface of all the reflectors, the reflectors being spaced from one another to admit the passage of light through sufficiently narrow zones that it falls onto the reflectors.

5. A luminair comprising a substantially point light source, a hemi-spherical reflector form above the light source, a downwardly acting reflector having the contour of a logarithmic spiral with its pole at the light center and extending outwardly from adjacent the lower edge of the reflector form and a plurality of downwardly acting reflectors of the same contour spaced below and within the first reflector.

6. A luminair comprising a substantially point light source, a hemi-spherical reflector form above the light source, a downwardly acting reflector having the contour of a logarithmic spiral with its pole at the light center and extending outwardly from adjacent the lower edge of the reflector form, a reflector supporting ring secured to the lower edge of the reflector form, a plurality of downwardly acting reflectors of the same contour spaced below and within the first reflector, and a frame carried by the first ring and supporting the inner edges of the lower reflectors.

7. A luminair comprising a light source, a spherical reflector placed above the light source and a plurality of translucent diffusing glass reflectors below the spherical reflector, each reflector being adapted to receive direct and reflected light at substantially uniform high angles of incidence throughout its entire area, and to reflect the dominant portion of the light at its incident surface whereby the character of the reflected beam is not substantially affected by selective absorption of the glass reflectors, the glass reflectors transmitting a small portion of the light whereby they appear luminous.

8. A luminair comprising a light source producing both visible and ultra-violet radiation, and a plurality of reflectors disposed about the same and having concave faces to receive the rays at substantially uniform high angles of incidence throughout their entire area, the reflectors being diffusely translucent to visible light and characterized by high reflection of both forms of radiation at said high angles of incidence and by negligible transmission of ultra-violet radiation, whereby a substantial portion of both forms of radiation is reflectively redirected and a small percentage of the visible light is diffusely transmitted through the reflectors to render the same luminous.

THOMAS W. ROLPH.